(No Model.) 3 Sheets—Sheet 1.
L. GUTMANN.
METER FOR ALTERNATING ELECTRIC CURRENTS.
No. 543,089. Patented July 23, 1895.
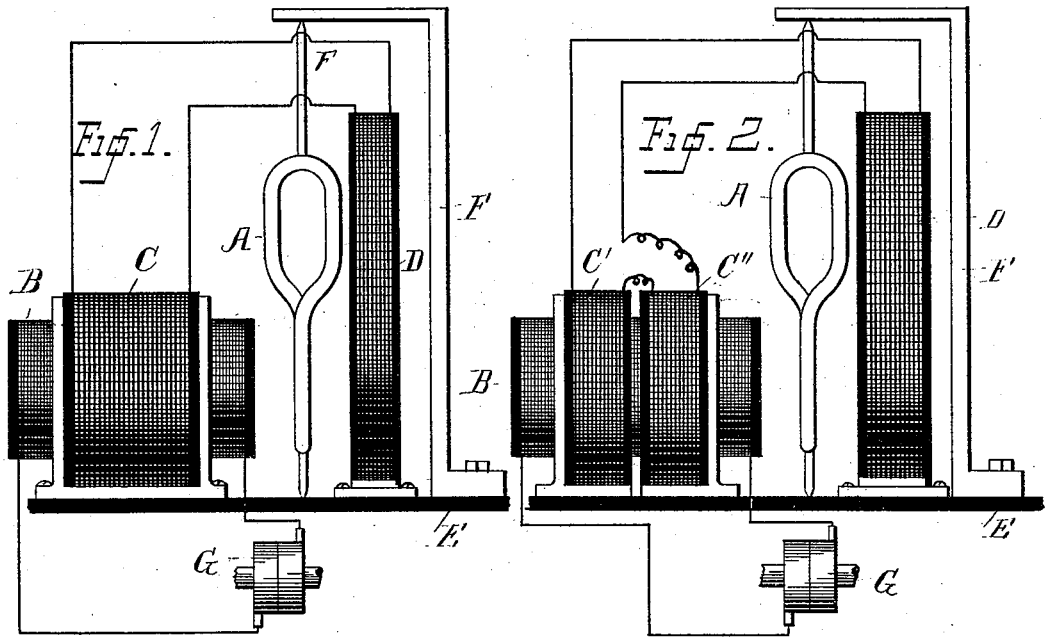
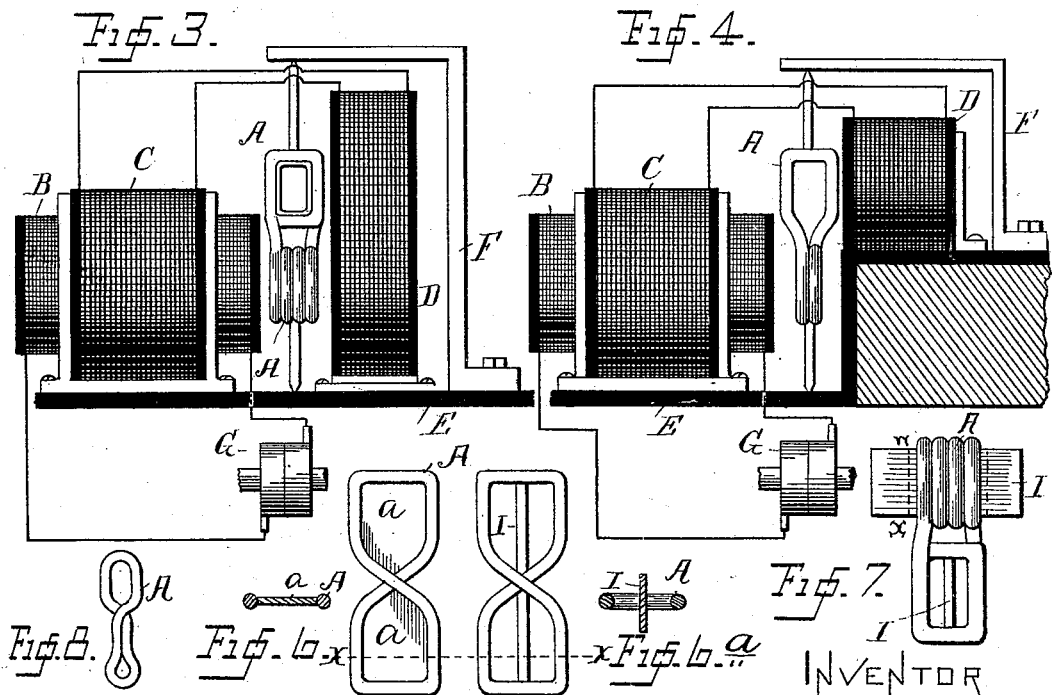
WITNESSES.
Will A. Courtland
Nellie L. Pope
INVENTOR
LUDWIG GUTMANN
BY HIS ATTORNEY
Edward P. Thompson (No Model.) 3 Sheets—Sheet 2.
L. GUTMANN.
METER FOR ALTERNATING ELECTRIC CURRENTS.
No. 543,089. Patented July 23, 1895.
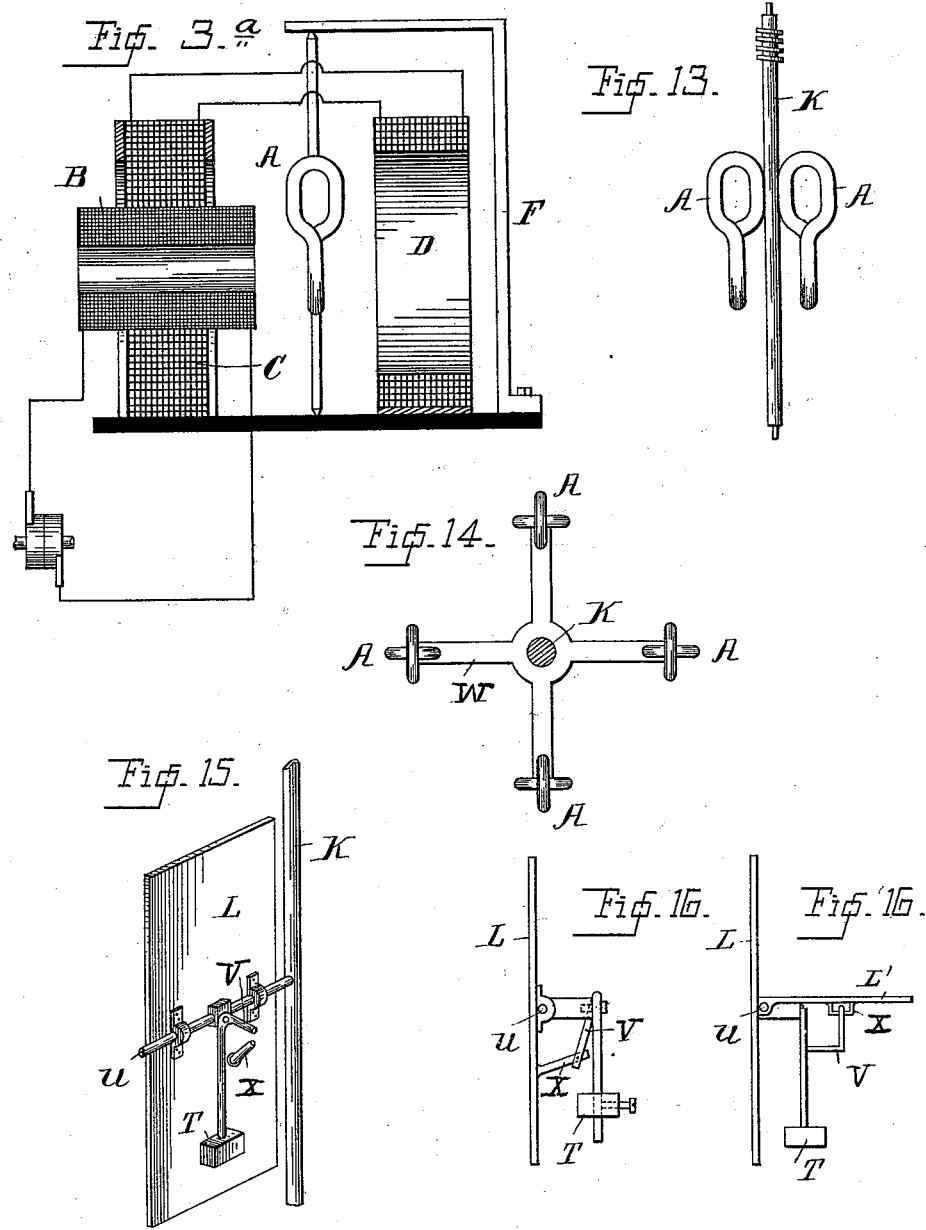
Witnesses
Will N. Courtland
Nellie L. Pope
Inventor
Ludwig Gutmann
By his Attorney
Edward P. Thompson (No Model.) 3 Sheets—Sheet 3.

L. GUTMANN.
METER FOR ALTERNATING ELECTRIC CURRENTS.

No. 543,089. Patented July 23, 1895.

WITNESSES
Will. A. Courtland
Nellie L. Pope

INVENTOR
LUDWIG GUTMANN
BY HIS ATTORNEY
Edward P. Thompson

UNITED STATES PATENT OFFICE.

LUDWIG GUTMANN, OF PITTSBURG, PENNSYLVANIA.

METER FOR ALTERNATING ELECTRIC CURRENTS.

SPECIFICATION forming part of Letters Patent No. 543,089, dated July 23, 1895.

Application filed May 20, 1890. Serial No. 352,435. (No model.)

*To all whom it may concern:*

Be it known that I, LUDWIG GUTMANN, a subject of the German Emperor, and a resident of Pittsburg, county of Allegheny, and State of Pennsylvania, have invented certain new and useful Improvements in Meter for Alternating Electric Currents, (Case No. 44,) of which the following is a specification.

The invention relates to an alternating, pulsating, or intermittent electric current meter.

The invention has for its object to measure the amount of energy or current consumed by the translating devices at the premises of the consumers. The construction and operation are illustrated and explained by the accompanying drawings and description.

Figure 12:
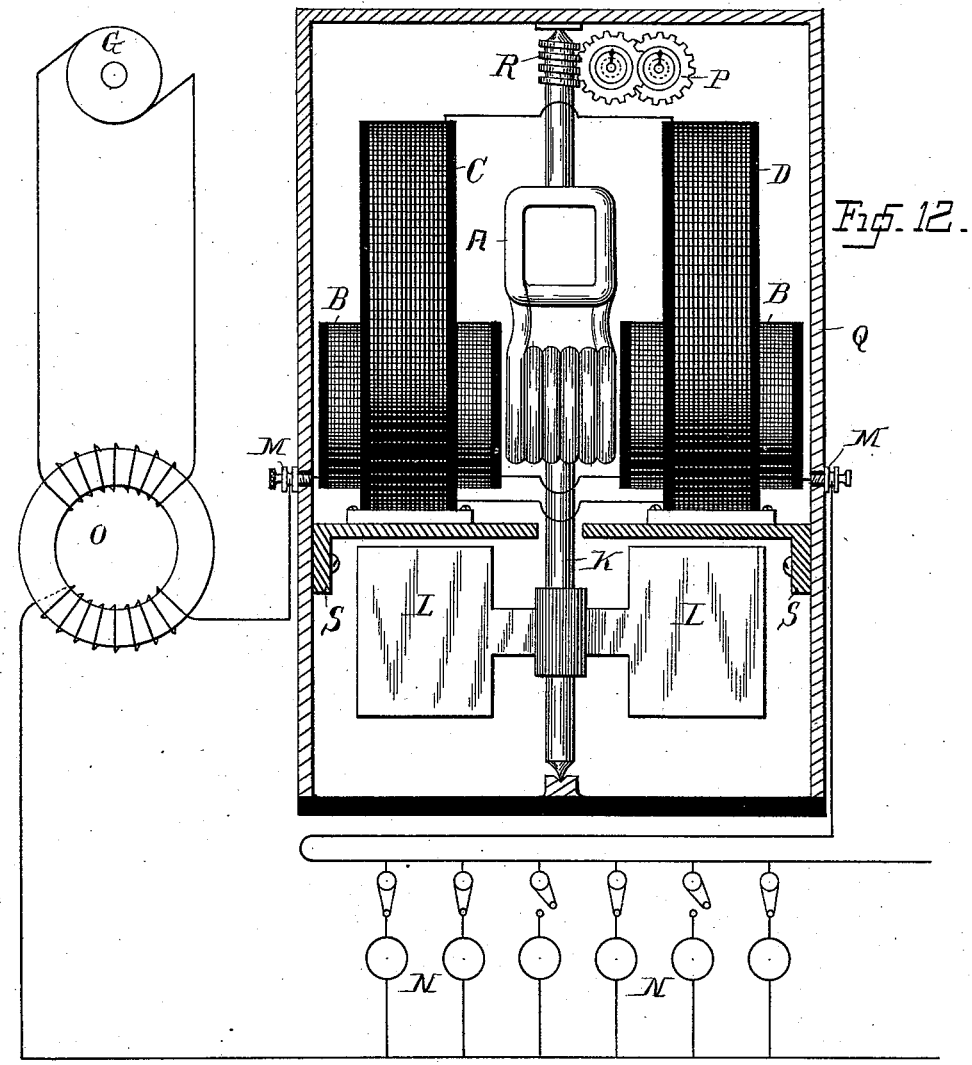
Figure 10:
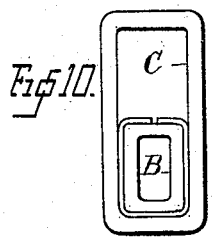
Figure 11:
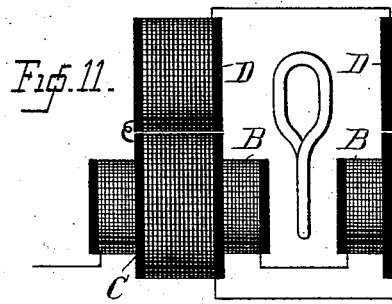
Figure 9:
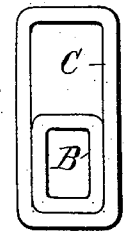

Figure 1 shows the simple form of the device without the indicator; and Figs. 2, 3, and 4 show the disposition of coils constituting modifications of Fig. 1. Fig. 3ª is a section of Fig 3. Figs. 5, 5ª, 6, and 6ª are detailed views of the first armature in Figs. 1 and 2 slightly modified, while Fig. 7 shows a view of another modified armature. Fig. 8 is another armature. Figs. 9 and 10 show further modified energizing-coils. Fig. 11 shows modified disposition of the energizing-coils. Fig. 12 shows the complete meter with indicator and fan in a work or domestic circuit. Figs. 13 and 14 are modifications of an armature consisting of two or more closed windings. Figs. 15, 16, and 16ª are detailed views of a retarding device.

In Figs. 1, 2, 3, and 4 the energizing-coils are in circuit with a generator.

A is an armature of a single closed magnetic or electric conductor, being closed upon itself.

B is the energizing-coil in circuit with a suitable generator G.

C is a secondary coil surrounding and in inductive proximity to coil B.

D is another secondary coil in electric connection with the coil C and facing both coils B and C and armature A.

E is an insulating base or stand.

F is the armature-shaft supporters.

G is the generator shown by conventional symbol such as its collector and brushes.

I is a metal core, preferably of iron or steel.

K is the rotary armature-shaft, vertical and pivoted top and bottom.

L is a fan acting as a retarding device.

M are the meter's binding-posts, electrically connecting with the energizing primary coils.

N are translating devices in circuit with the meter.

O is a converter in circuit with both generator G and meter.

P is a train of wheels and hands to indicate the amount consumed and geared to the shaft K.

Q is the meter-frame.

R is the worm on armature-shaft for operating the train of wheels.

S is a bracket-support for the energizing-coils.

In Fig. 1 the energizing-coil B is shown to be connected to the generator G. Over this coil is slipped another one C, which may be insulated electrically from the former and may have a current induced in its windings, the coil being closed through the third stationary coil D. All the three coils B, C, and D have their axes in the same plane. In Figs. 1 and 4 the axes lie parallel to one another in the same plane, while in Fig. 3ª all three have a common axis. Supported on the shaft K is the armature A (consisting of a coil) of iron, steel, copper, or other conducting-wire, which in its central part is twisted in the direction of its length, so that the plane of the upper part or half does not coincide with that of the lower part or half. The winding is by preference bare and at the twist. The opposite sides may be in good metallic contact so that this one closed wire may form two closed circuits, one above the other.

Referring to Figs. 1 and 2, it will be observed that the lower half armature or the lower closed circuit-coil is so located that its axis coincides with that of the primary coil B, but not with that of D; further, that the upper half of the armature or the upper closed circuit-coil is out of the influence of the primary coil B, but still within the influence of the coil D.

If we assume the simplest case of having an armature whose upper half stands at right angles to the lower one, and, further, that starting position is that shown in Figs. 1 and 2, then on closing the circuit of which coil B forms a part at any one impulse its field induces secondary currents in the lower armature half, which causes it to be repelled to a position at right angles thereto, so that the upper half of the armature stands parallel with coil D. This coil is also the seat of induced secondary currents and acts with its field on the upper closed armature-circuit. Being independent of the lower it forms a secondary field to that of the coil D and consequently is repelled in the same direction as before until it has reached the starting position, when the action is repeated.

To facilitate rotation still more, the armature may be modified as shown in Fig. 8, where it is represented by a loop having two twists—i. e., the conductor and also its magnetic axis lie in three different planes angularly displaced around its revolving axis. This is done to obtain a prolonged action of the primary coil on the armature. It is evident that the armature may further be modified, so that different parts will lie in four or more different planes, and consequently having its magnetic poles at right angles to the position of the conductor and expose more than one pole to both the inducing-coil as also to the secondary poles or coils carrying currents of displaced phase at different positions during one revolution.

Fig. 2 shows a modification in which the coil C is divided into two parts C' and C'' and movable along coil B.

Fig. 3 shows a further modification. The armature instead of being made of a single loop is shown to consist of a coil of several convolutions whose ends are connected with one another and whose polar axes stand under an angle to one another. This armature A works similarly, but turns with greater force than armature A', and in this case both coils of A may act similarly to two hollow cylinders, one on top of the other, which disposition may be adopted without departing from the nature of the invention. Another disposition is shown in Fig. 4. The armature A is shown to consist of two coils of a few turns of heavy wire and the coil D is raised on its foundation E, so that the coil D will influence but the upper part. The magnetic axes of the lower part of the armature A—if the convolutions stand parallel with those of coil B—are made to coincide while under similar condition with respect to the upper part of armature A in relation to coil D; also their axes coincide.

Fig. 5 shows a modified armature A, inasmuch as the central space is not left open, as in Figs. 1 and 2, but is filled by a sheet $a$, such as steel, iron, copper, or brass. For a clearer understanding the cross-section is shown in Fig. 6 at the line X of Fig. 5. It is evident that the whole armature can be a copper or iron conductor with a copper or iron sheet fixed internally or may consist simply of a strip of iron or copper in a single piece.

Fig. 5$^a$ shows a further modification of the armature A. The electric or magnetic conductor is provided with a core I, whose axis coincides with that of the coil. The core preferably consists of a piece of iron or steel rigidly mounted in the conductor, the cross-section being shown in Fig. 6$^a$.

Fig. 7 is another modification of the armature. The improvement consists in providing a magnetic core I to increase the action of the coils. The core I may consist of one or more pieces of iron or steel and may extend flush with the winding, as indicated by the dotted lines $w\ x\ w\ x$, or else it may project as shown, Fig. 7, to increase the resistance to rotation by the air friction it would cause.

Fig. 8 has been described above as an armature whose conductor cannot be placed into two planes, but none less than three, and consequently would develop magnetic poles acting at right angles to their part of the winding in three different directions.

Figs. 9 and 10 show modifications of the coils B and C. In Fig. 9 the coil C is shown to inclose the energizing-coil B, which rests in the lower half of the coil C, the coils being electrically insulated from one another. Fig. 10 is a modification of Fig. 9, showing the two coils B and C separated from one another by a suitable non-conductor. It is of course evident that the dispositions of the coils B and C are interchangeable.

Fig. 11 shows a further modification of the coils B, C, and D. All coils are shown to consist of two coils. The double B have a common axis with the double coils C and the double coils D, which rest on top of coils C and have their common axes parallel but in the same plane as the double coils B and C. The coils C and D are in electrical connection with one another.

Fig. 12 shows the complete meter. The energizing-coils are still further modified. For the sake of simplicity and capacity the coil D is subjected, like coil C, to the direct influence of a coil B. The two halves of coil B are electrically connected to the same circuit of converter O, in which a variable number of lamps N are operated, and the coils C and D form, as before, a closed circuit. The preferred form and disposition of coils B C and coils B D are shown in Figs. 9 and 10. The coils B are connected to terminals M, which latter are mounted on but electrically insulated from the frame or box Q, the coils B, C, and D being mounted on supports S. Between these coils is mounted the armature A, which is rigidly attached to the shaft K adapted to rotate. The shaft is provided with a worm R for moving the registering apparatus P. To obtain proportional action or speed of the motor, the retarding device or fan L is fixed to the shaft consisting of one, two, three, or more blades, it being well known that the motor speed increases with the square of the current, and that to obtain direct readings or indication in the registering apparatus, which is similar or identical to that in a gas-meter, a retarding device need be applied which opposes the motor speed in the same proportion. To obtain these conditions and to make the meter an accurate one depends solely on proper proportioning of parts and calibration of the apparatus.

In Figs. 15, 16, and 16ᵃ L and L' are fans or blades; T, a weight adapted to change its position by centrifugal force; U, an arm or support for the blades; V, a lever operated by the weight T, and X a projection on the blade or fan L.

Fig. 13 represents a shaft with a modified armature, which consists in this case of two loops, placed parallel to one another rigidly attached to each side of the shaft. This form may be further modified by using instead of two any greater number—for instance, ten or fifteen—all around the shaft and in close proximity to one another. Instead of attaching one or more such loops directly to the shaft, as in Fig. 13, the modification shown in Fig. 14, which is a view from the top, may be adopted. Here the shaft K is provided with a spider W, carrying at its ends the loops A. Here there are four such loops constituting the armature. Also in this case may the number be multiplied to advantage, so that the convolutions may be in close proximity to one another and a more even and gradual torque insured. For ordinary purposes rigid fan-blades, as shown in Fig. 12, can be used, as there is no difficulty in obtaining proportional action by selecting the size of blades to the coils employed; but for registration of currents where there are large variations in load, especially for meters of large range and capacity, it is desirable to be able to have means for adjusting and varying the resistance to rotation at the fans themselves at the high speeds of the meter for obtaining the desired proportional action. This is accomplished by deflecting the whole blades or portions thereof to produce a smaller friction-surface. This is shown in Figs. 15 and 16. Fig. 15 gives a perspective view of one blade and Fig. 16 an end view of the same. The shaft K is provided with spokes $u$, on which are mounted movable the blade L, and also a lever V, provided with a weight T, which is adapted to move away from the shaft by action of the centrifugal force. In doing so the lever V, Figs. 15 and 16, engages with the projection or pin X, thereby forcing the blade L from its normal position into other positions exposing smaller surface for air friction. It is self-evident that instead of moving the whole blade, Fig. 15, it may be constructed so that the upper half may be stationary, while but the lower half is adapted to change its position, so as to lie in different planes around its axis U. Fig. 16ᵃ shows another but similar device for obtaining the same action. As in this form no special bearings are provided, the resistance for the blades to slide around the shaft $u$ is reduced.

I claim as my invention—

1. In an electric meter, the combination with two or more energized coils of an armature whose winding or windings lie in two planes, of a retarding device mounted on the armature shaft, and means such as gears for registering or integrating the current passed through the meter.

2. In an electric meter system, the combination with a suitable source, of a supply circuit containing translating devices and a meter consisting of energizing coils connected in the supply circuit, secondary coils in inductive distance to the former, an armature having its winding lying in two or more planes to one another, a retarding device mounted on said armature and a registering device geared to the shaft of said armature.

3. In an electric meter system, the combination with a circuit and translating devices, of an armature having its winding or windings located in two or more planes, of one set of coils included in circuit with said translating devices and acting on one part of the armature, one or more other sets of coils acting on another part of said armature, a retarding device rigidly mounted on said armature, and a registering device connected and operated by the rotating armature shaft.

4. In an electric meter system, the combination with an armature having a part of its conductor lying in a given plane and the remaining part in another plane, of a primary energizing or electro magnet coil connected electrically to a suitable generator, and a secondary coil in inductive proximity to the former, all stationary, the primary and secondary energizing coils having their axes lying parallel to each in the same plane.

5. In an electric meter, the combination of an armature having one or more closed windings lying in two or more planes, two or more sets of windings each of which is adapted to influence a different portion of the winding with respect to the other, a retarding device rigidly attached to said armature and a registering device geared to said armature.

6. In an electric meter the combination of an armature having closed windings lying in two or more planes, a shaft for said armature, a registering device connected to said shaft, a retarding device rigidly attached to said shaft and coils acting on said armature by magnetic fields in non-intersecting planes.

7. In an electric meter, the combination with two or more stationary energizing coils, of an armature whose windings lie in different planes rigidly mounted on a shaft adapted to rotate and fans and a registering train for the purpose described.

8. In an electric meter system, the combination of a circuit connected to a suitable source and containing translating devices, an armature having one or more closed circuits adapted to rotate, a retarding device and a counting mechanism connected to said armature and two sets of energizing windings one being in series with the translating devices and acting on one portion of the armature, and the second set of energizing windings being located so as to permanently influence a different portion of the armature.

9. In an electric meter, the combination with two or more sets of energizing coils, retarding device, armature shaft and counting train, of an armature having two or more closed circuits all of which are mounted rigidly on said armature shaft.

In testimony that I claim the foregoing as my invention I have signed my name, in presence of two witnesses, this 15th day of March, 1890.

LUDWIG GUTMANN.

Witnesses:
F. E. J. LITQT,
SAMUEL WALLACE.